US00RE43884E

(19) United States
(12) Reissued Patent
Friel, Sr. et al.

(10) Patent Number: US RE43,884 E
(45) Date of Reissued Patent: Jan. 1, 2013

(54) APPARATUS FOR PRECISION STEELING/CONDITIONING OF KNIFE EDGES

(75) Inventors: Daniel D. Friel, Sr., Greenville, DE (US); Daniel D. Friel, Jr., Kennett Square, PA (US); Robert P. Bigliano, Wilmington, DE (US); Abraham Leibson, Lambertville, NJ (US)

(73) Assignee: Edgecraft Corporation, Avondale, PA (US)

(21) Appl. No.: 13/175,369

(22) Filed: Jul. 1, 2011

Related U.S. Patent Documents

Reissue of:
(64) Patent No.: 7,287,445
Issued: Oct. 30, 2007
Appl. No.: 11/123,959
Filed: May 6, 2005

U.S. Applications:
(63) Continuation-in-part of application No. 10/803,419, filed on Mar. 18, 2004, now Pat. No. 7,235,004.

(60) Provisional application No. 60/568,839, filed on May 6, 2004, provisional application No. 60/457,993, filed on Mar. 27, 2003.

(51) Int. Cl.
*B24D 15/00* (2006.01)
*D21K 5/12* (2006.01)

(52) U.S. Cl. ..... 76/81; 76/84; 451/349

(58) Field of Classification Search ..... 76/81, 84; 451/359, 367, 369, 370, 371
See application file for complete search history.

(56) References Cited

U.S. PATENT DOCUMENTS

| | | | | |
|---|---|---|---|---|
| 1,075,690 | A | 10/1913 | Buck | |
| 1,181,161 | A | 5/1916 | Perry | |
| 1,681,763 | A | 8/1928 | Eaton | |
| 1,936,990 | A | 11/1933 | Piermann | |
| 2,098,530 | A | 11/1937 | Battocchi | |
| 2,249,218 | A | 7/1941 | Meade et al. | |
| 2,461,690 | A | 2/1949 | Leong | |
| 2,559,273 | A | 7/1951 | Brinkley | |
| 2,645,066 | A | 7/1953 | Andrews | |
| 2,652,667 | A * | 9/1953 | Arnold | 451/555 |
| 2,653,667 | A | 9/1953 | Genin et al. | |
| 2,896,482 | A | 7/1959 | Hyde | |
| 3,332,173 | A | 7/1967 | McMaster et al. | |
| 3,619,955 | A | 11/1971 | Fischback | |
| 3,819,170 | A | 6/1974 | Longbrake | |
| 4,170,343 | A | 10/1979 | Longbrake | |
| 4,285,253 | A | 8/1981 | Edling | |
| 4,441,279 | A | 4/1984 | Storm et al. | |
| 4,450,653 | A | 5/1984 | Fletcher | |
| 4,486,982 | A | 12/1984 | Longbrake | |
| 4,512,112 | A | 4/1985 | LeVine | |
| 4,538,382 | A | 9/1985 | Johannsen | |
| 4,602,531 | A | 7/1986 | Korhonen | |

(Continued)

*Primary Examiner* — Maurina Rachuba
(74) *Attorney, Agent, or Firm* — Connolly Bove Lodge & Hutz LLP

(57) ABSTRACT

An apparatus for manually steeling or conditioning the edge of a knife blade comprises a precision angle guide attached to a manual sharpening steel. The angle guide establishes a guiding surface that provides for sustained sliding or rolling contact with the face of the knife blade such that the plane of at least one edge facet adjacent to the edge of the blade is maintained at a precisely established angle relative to the plane of the sharpening steel surface at the contact point of the facet with the surface of the sharpening steel.

26 Claims, 6 Drawing Sheets

U.S. PATENT DOCUMENTS

| | | | |
|---|---|---|---|
| 4,611,437 | A | 9/1986 | Cohen |
| 4,627,194 | A | 12/1986 | Friel |
| 4,714,239 | A | 12/1987 | LeVine |
| 4,716,689 | A | 1/1988 | Friel |
| 4,777,770 | A | 10/1988 | LeVine |
| 4,799,335 | A | 1/1989 | Battocchi |
| 4,807,399 | A | 2/1989 | Friel |
| D303,209 | S | 9/1989 | Friel |
| 4,897,965 | A | 2/1990 | Friel |
| 4,912,881 | A | 4/1990 | McDougall |
| D310,620 | S | 9/1990 | Friel |
| 5,005,319 | A | 4/1991 | Friel |
| D328,410 | S | 8/1992 | Friel |
| 5,148,634 | A | 9/1992 | Bigliano et al. |
| 5,185,958 | A | 2/1993 | Dale |
| 5,199,225 | A | 4/1993 | Esposito |
| 5,245,791 | A | 9/1993 | Bigliano et al. |
| D342,003 | S | 12/1993 | Friel et al. |
| D348,598 | S | 7/1994 | Friel, Jr. et al. |
| 5,357,717 | A | 10/1994 | Friel, Jr. et al. |
| 5,390,431 | A | 2/1995 | Friel |
| D357,395 | S | 4/1995 | Friel |
| 5,404,679 | A | 4/1995 | Friel et al. |
| 5,431,070 | A | 7/1995 | Thames |
| 5,440,953 | A | 8/1995 | Gangelhoff et al. |
| 5,449,315 | A | 9/1995 | Friel |
| 5,458,534 | A | 10/1995 | Campione et al. |
| D368,217 | S | 3/1996 | Friel |
| 5,582,535 | A | 12/1996 | Friel |
| 5,582,542 | A | 12/1996 | Stein |
| 5,611,726 | A | 3/1997 | Friel et al. |
| 5,636,556 | A | 6/1997 | Friedlander et al. |
| 5,667,427 | A | 9/1997 | Airhart et al. |
| D388,304 | S | 12/1997 | Friel |
| 5,868,611 | A | 2/1999 | Friel |
| D408,254 | S | 4/1999 | Friel, Jr. et al. |
| D409,891 | S | 5/1999 | Friel et al. |
| 6,012,971 | A | 1/2000 | Friel, Sr. et al. |
| 6,113,476 | A | 9/2000 | Friel, Sr. et al. |
| 6,267,652 | B1 | 7/2001 | Friel, Sr. et al. |
| 6,371,841 | B1 | 4/2002 | Ray |
| 6,726,551 | B2 | 4/2004 | Friel, Sr. |
| 6,863,600 | B2 | 3/2005 | Friel, Sr. |
| 6,875,093 | B2 | 4/2005 | Friel, Sr. et al. |
| 7,052,385 | B1 | 5/2006 | Swartz |
| 2004/0116055 | A1 | 6/2004 | Friel |
| 2006/0276110 | A1 | 12/2006 | Friel et al. |

* cited by examiner

Fig.3.
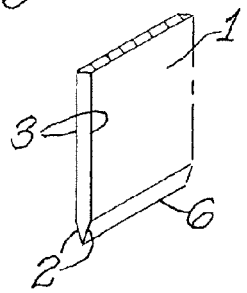
Fig.4.
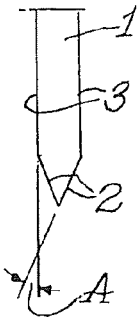
Fig.7.
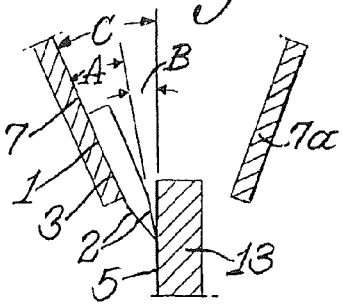
Fig.6.
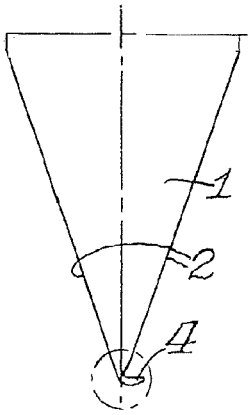
Fig.8.
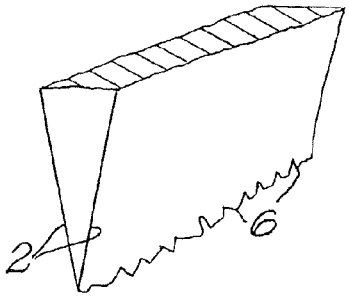
Fig.9.
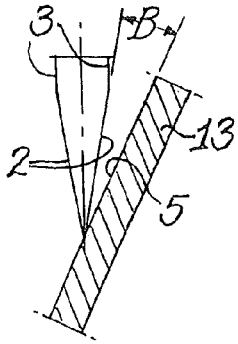
Fig.5(PriorArt)
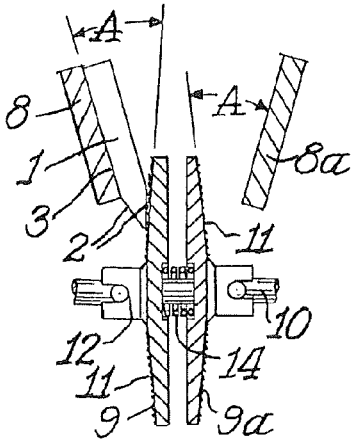
Fig.10.
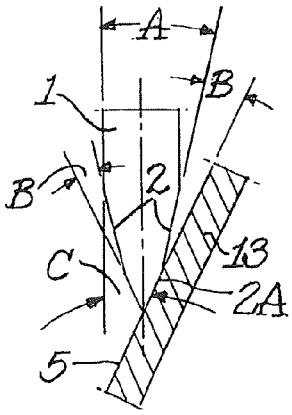

APPARATUS FOR PRECISION STEELING/CONDITIONING OF KNIFE EDGES

Matter enclosed in heavy brackets [ ] appears in the original patent but forms no part of this reissue specification; matter printed in italics indicates the additions made by reissue.

CROSS REFERENCE TO RELATED APPLICATION

This application is based upon provisional application Ser. No. 60/568,839, filed May 6, 2004 and is a continuation-in-part of Ser. No. 10/803,419, filed Mar. 18, 2004 which is based upon provisional application Ser. No. [60/457,933] *60/457,993*, filed Mar. 27, 2003.

BACKGROUND OF THE INVENTION

Manual sharpening steels have been used for years with the belief that they are a means of straightening the burr from knife edges following the sharpening of edges with manual or powered abrasive stones. Butchers have found the manual sharpening steel to be useful when slaughtering or butchering in work areas removed from electrical power and running water. The exact nature of what can occur during the steeling process has been until recently the subject of extensive speculation with little understanding of mechanisms that can occur at the edge of a blade as it is being impacted under controlled precisely repetitive conditions against a sharpening steel.

Use of the manual steel rod has been more of a mystique than a science, lacking any scientific base or understanding. It has been said for example that the manual rods "smooth out microscopic nicks in the blades surface and realigns the molecules in the cutting edge". Also one reads that "the best steels are magnetized to help draw the molecules into realignment," or "the alignment of molecules in a knife blade are reinforced whenever it is sharpened, . . . and the process removes very little actual metal from the blade". Others repeat that the use of a steel "realigns and smoothes the knife's edge". Most often it is thought that the steel "burnishes against the hard surface of the cutting edge for the purpose of straightening it back out so that it is the same way as when it was manufactured".

Clearly steeling of knife blades has been a poorly understood art and not a science. It is clear to those founded in science and physics that the force of magnetism incorporated in some commercial sharpening rods is far too feeble to have any effect at the atomic level in steel and even too feeble to alter the physical structure of any burr attached to the edge.

In the prior art the angle of the facet as presented to the hardened surface of the manual sharpening steel has been totally random and entirely dependent on operator skill. For this reason, prior means of steeling knife edges lack the precision and reproducibility discovered by these inventors to be necessary for creating an optimum consistent physical structure along the cutting edge of blades irrespective of the geometry and size of the blade geometry or the skill of the user.

While manual sharpening steels have been sold for many years they have not become popular with the general public because they are dangerous to use and a very high degree of skill and practice is required to realize any improvement in the cutting ability of a dull knife edge.

SUMMARY OF THE INVENTION

These inventors have recently demonstrated that if a knife edge previously sharpened at a given angle is repeatedly pulled across a hardened surface, generally harder than the metal of the blade, at a precisely and consistently controlled angle relative to the sharpening angle of the same blade that a remarkably consistent and desirable microstructure can be created along the edge of the knife blade. It has been shown that a manual sharpening steel can be used as the hardened surface needed to create this novel edge structure. This is a form of edge conditioning unlike conventional sharpening or conventional steeling.

In order to realize the optimum edge structure along a knife edge these inventors have found as explained in more detail in following sections that the plane of the edge facet is best held at an angle close to the plane of the hardened surface at their point of contact and that the angular difference between those planes must be maintained every stroke after stroke of the blade facet as the knife edge is moved along and against the hardened non-abrasive surface, or sharpening steel.

The unique microstructure which can be created along the knife edge consists of a remarkably uniform series of microteeth with dimensions generally equal to or less than the width of a human hair. The microteeth are very regular, and strong and they can be readily recreated along the edge if any are damaged in use of the knife edge.

Creation of this microstructure requires that the knife edge facets be held at a precise and reproducible angle relative to the sharpening steel, stroke after stroke. Under optimum conditions, the desired edge structure develops with only a small number of such strokes across the edge of the hardened surface or steel. Further unlike manual steeling which has lacked reproducible control of the angle, under the conditions described here the edge is not dulled, instead the original sharpening angle is retained even after hundreds of steeling-like strokes—so long as precise control of the angle is maintained.

THE DRAWINGS

FIGS. 3-4 illustrate a knife blade that can be enhanced in accordance with this invention;

FIG. 5 illustrates in cross-section a portion of a prior art knife sharpener using abrasive sharpening members;

FIG. 6 is a side elevational view of a knife blade sharpened by abrasive members leaving a burr;

FIG. 7 is a cross-sectional view in elevation showing the conditioning of a knife blade in accordance with this invention;

FIG. 8 is a perspective view showing the conditioned knife blade with microteeth along the edge;

FIGS. 9-10 are cross-sectional views showing the conditioning of a knife blade in accordance with this invention;

DETAILED DESCRIPTION

Figure 1:
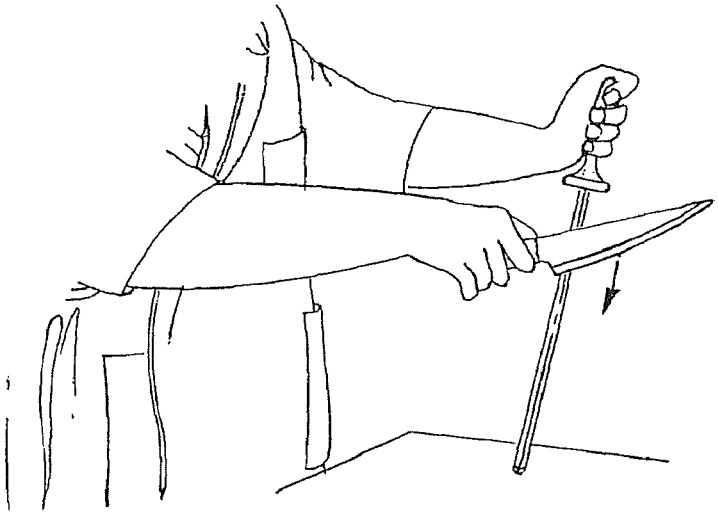
Fig. 1. (Prior Art)
FIGS. 1 and 2 illustrate prior art steeling techniques.

The present invention incorporates some of the teachings of copending application Ser. No. 10/803,419 filed Mar. 18, 2004, all of the details of which are incorporated herein by reference thereto.

Conventional manual so-called "sharpening" steels are usually constructed with a handle by which the steel rod can be held or supported. The steel is often held end-down against a table or counter by one hand as in FIG. 1 (prior art) while the knife is held in the second hand and stroked simultaneously across and down the surface of the steel. Neither the angle of the steel or the angle of the blade across the steel is accurately controlled. Each can vary stroke to stroke or drift in angle during the steeling process and between successive steeling. Alternatively the sharpening steel is held in the air FIG. 2 (prior art) without support as the steel knife blade is moved across and along the surface of the steel. This latter approach offers even less control of the relative angles between the planes of the edge facets and the plane of the contact point along the steel. The sharpening steel has proven to be a poor haphazard and inconsistent tool for improving the cutting ability of a knife edge. Even the most skillful and persevering artisans who use a steel end up with edges of poor edge quality, not very sharp and very fragile requiring re-steeling after every 50 or so cuts. Frequent resharpening of the edge with an abrasive stone has proven necessary and the life of the knife is consequently shortened.

The improved apparatus and methods developed by these inventors to produce superior cutting edges depends upon precise and consistent control of the angles during the edge conditioning process. The present description relates a variety of apparatus that incorporate a hardened sharpening steel or sections of hardened rods to achieve surprisingly effective cutting edges on knives. A conventional knife blade 1, shown in section, FIG. 3 has two faces 3 which are sharpened at their terminus to form two facets 2 which converge along a line creating the edge 6. Sharpening as contrast to steeling a knife blade involves the use of abrasives to physically abrade away metal of the blade along each side of the knife edge creating edge facets 2 on each side of the edge 6.

In order to realize optimum results with the edge conditioning apparatus for knives described here, it has been demonstrated that it is important first to create (sharpen) the blade facets 2 at a precisely established, known angle relative to faces 3 of the blade. FIG. 4 represents a typical blade where the facets 2 are sharpened at an angle A relative to the respective faces 3 of the blade. If the sharpening angle A is precisely established as created with a precision sharpening means such as shown in FIG. 5 the edge facets subsequently can be precisely positioned using the same reference plane namely the face 3 of the blade. The sharpening means illustrated in FIG. 5 uses the face of the blade 3 as a reference plane for the blade that rests on a guide face 8 and alternating on guide face 8a. The facet 2 is moved into contact with the surface of abrasive disk 9 which at the contact point with the facet is set at angle A relative to the guide surface 8 and the blade face 3. In this prior art sharpener FIG. 5 the abrasive coated disks 9 and 9a are rotated by a motor driven shaft 10. Pins 12 on the shaft engage in slots that are part of the disk support structure in order to rotate the disks. Each of the two blade facets are commonly sharpened at the same angle A.

When the knife facets are sharpened as described a burr 4 is left along the edge of the blade. See FIG. 6. The abrading process leaves a burr because the lateral force necessary to abrade the facet and sharpen the edge exceeds that necessary to bend the very fine thin edge being formed. The edge becomes literally a foil like structure at the terminus of the facets and that structure is readily bent. It is commonly believed and taught that the manual steel is used to straighten out that burr and to align it with the transverse axis of the blade at the edge. What actually happens with a hardened steel rod can indeed be very different from that if the relative angles of the facet and the hardened surface are precisely controlled, and if the contact pressures and the angular relationships are maintained stroke after stroke.

Consequently if the blade facets 2 are at angle A and the facets are presented repeatedly and consistently in a sliding motion in contact with the surface of a hardened material (such as a manual steel) at Angle C which is close to Angle A, FIG. 7, a remarkably desirable microstructure can be created along the knife blade. Ideally to achieve this angular difference B between the angle C and angle A, angle B is less than 10 degrees preferably closer to 5 degrees. Guide faces 7 and 7a align with the face 3 of the blade 1 to set the plane of the facet, presharpened at angle A, at an angular difference B between the plane of the hardened surface 5 of the plane of the hardened rod 13 at the point of contact.

The desirable microstructure that can be created by the precise control of the angular relationship of the plane of the edge facet with the plane of the hardened surface is illustrated in FIG. 8. After the burr 4 of FIG. 6 is completely removed an amazingly regular row of microteeth is created along the knife edge. If individual microteeth along the edge are damaged or broken off when the blade is used for cutting, those microteeth will be replaced by successive movement of the facet along the hardened surface, alternating the strokes along one side of the edge and then the other. The repeated and alternating stresses created along the cutting edge by this motion hardens the knife's metal, making it more brittle and prone to fracture and fragment. This causes small sections of the edge to drop off leaving a microtooth-like structure along the edge. As one continues to stroke the edge on alternate sides of the edge, more microteeth drop off as new microteeth are formed. That process can be repeated many times.

In creating the optimum edge structure by the novel and precise means described here the hardened contact surface 5 of member 13 will initially make contact with the facet only at the extremity of the facet 2, FIG. 9 adjacent to the edge. As the burr is removed, the hardened surface will also remove microscopic amounts of metal adjacent to the edge and the lower most section of the facet will after many strokes, begin to be re-angled to an angle closer to that of the hardened surface. Thus a line and larger area of contact 2A, FIG. 10 develops between the lower section of the facet and the contacted surface 5 on the hardened member. This growing area of contact 2A, FIG. 10 resulting from many repetitive strokes of the facet against the hardened surface is important to stabilize the localized pressure against the developing edge structure and thereby to reduce the probability of prematurely breaking off the microteeth during subsequent reconditioning of the edge. This mechanism which relies on the highly precise and consistent angular relation between the facet and hardened surface reduces the opportunity for the hardened surface to impact under the edge and knock off the microteeth by that impact rather than by the desirable repetitive wearing along the side of the facet and the resulting stress hardening and fracturing process.

The hardened member 13 can be a manual "sharpening" steel. Such steels are sold with a variety of surface treatment and hardness. Consequently some will be better than others in developing the unique microstructure described here and represented in FIG. 8. However, most manual steels are of a quality that can produce good results if an adequately precise angle control is provided to orient the plane of the edge facet precisely and preferably within 5-10 degrees of the plane of the steel surface at the point of contact with the edge facet. It is to be understood that as used herein the reference to "sharpening steel" is not intended to be limited to, for example, steeling rods made of steel, although that is the preferred practice of the invention. Instead, other equivalent materials could be used. What is important is that the materials should have a hardened surface which contacts the knife edge and should be of a hardness harder than that of the knife edge. For example, the hardened surface can have a hardness above Rockwell C-60. Such "sharpening steel" should be capable of developing the microstructure described here as represented in FIG. 8.

There are a number of possible designs for precision angle guides with the necessary angular precision that can be mounted onto a manual steel. Alternatively the angle guide structure can be designed so that the manual steels or short lengths of manual steel rods can be mounted onto the guide support structure. These must have the required precision to control accurately the angular position of the knife and its facets relative to the surface of the steel stroke after stroke in order to create the optimum microstructure referred to in this patent. Several examples of such designs are described here to be representative of a large variety of designs that incorporate the necessary angular accuracy and reproducibility.

One of the most reliable and reproducible physical features of a blade that can be used as a reference in order to locate precisely the blade facets and edge structure relative to the hardened steel rod are the faces of the blade. Features which are affected by the thickness of the blade or the width of the blade has proven to be much less reliable. Consequently the designs illustrated here rely on referencing the faces of the blade resting against a reliable angle guide for precise angular orientation of the edge facets on the steel structure as this microstructure is created.

When using a manual steel repeatedly without precise angular control, the relatively precise angle and geometry of the facets created in the prior abrasive sharpening process are steadily destroyed. The original sharpness of the edge is lost, the facets and the edge become rounded and the edge is quite dull. This process occurs quite rapidly particularly with the unskilled person and the blade must be resharpened with an abrasive frequently thereby removing more metal from the blade and shortening its effective life and usefulness.

As pointed out in co-pending patent application Ser. No. 10/803,419 it is preferred that the hardened surface of the object which conditions the knife edge should be non-abrasive. The invention, however, can be broadly practiced where the hardened surface is slightly abrasive. What is important is that the hardened surface should be sufficiently smooth or non-abrasive so that in combination with the knife guide the combination comprises means to minimize interference with burr removal and to repeatedly create and fracture a microstructure along the edge of the blade at the extreme terminus of the edge facets during repeated contact of the facets and the hardened surface to create a microserrated edge. Preferably, the hardened surface of the steeling rod would have a surface roughness no greater than 10 microns.

Figure 13:
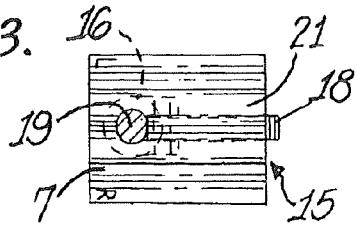
FIGS. 11-15 illustrate a guide for the conditioning of a knife blade in accordance with one embodiment of this invention.
Figure 11:
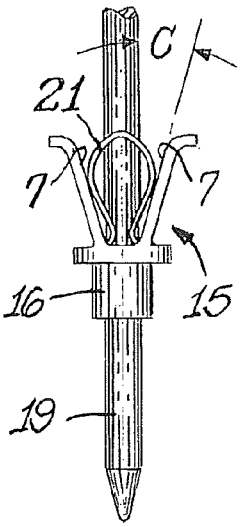
Figure 12:
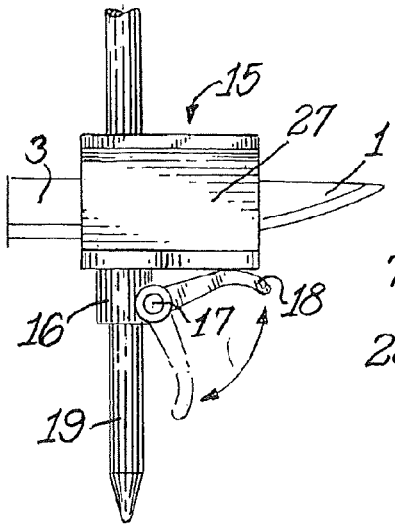
Figure 15:
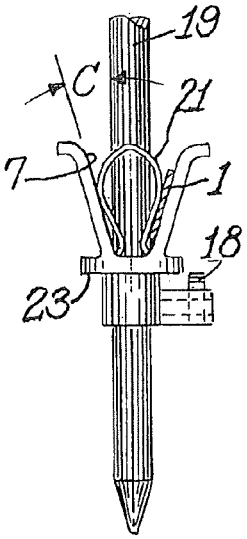

An example of a precision knife guide 15 tat can be mounted on a manual steel 19 or a section thereof is shown in FIGS. 11, 12 and 13. This guide 15 is constructed with a tight sleeve-like collar 16 that fits snugly around the steel and which can be provided with a locking mechanism 17 for example that cams against the steel and can be tightened by a manually operated lever 18 to position this guide at any desired location along the length of the steel. The mounting and locking structure must be designed with sufficient care that the guide planes are held firmly and securely relative to the steel 19 as the face 3 of knife 1, FIGS. 12 and 15 is moved along and in intimate contact with the guide planes surface 7. An optional spring 21 can be provided to insure that the face of blade 1, FIG. 15 is pressed into intimate contact with the guide surface face 7 on every stroke. Ideally the guiding surface forms an acute angle with the surface of the manual steel in order that the knife facet is stopped by the steel as the knife edge is pressed into the acute angular vertex formed by the guide and the surface of the steel.

Figure 14:
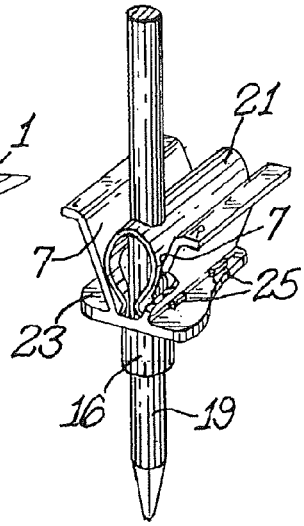
Figure 14A:
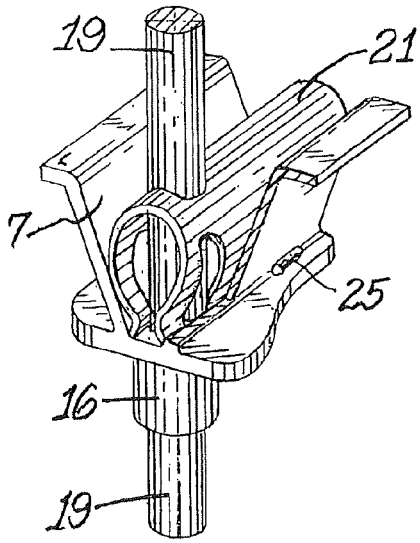

The spring 21 is designed to conform closely to the geometry of the guide planes 7 in the absence of the blade. Spring 21 can be supported and centered as shown by the steel rod or alternatively it can be supported by the base structure 23 for the guides. As shown in FIG. 14 it can extend the full length of the guide planes to provide support along the length of the blade and to press the blade against the surface of the guide including the tip of the blade as it is withdrawn along the guide structure. The springs can as designed with short "feet" 25 that insert through matching slots in the guide plates 27 to hold the springs down and in place.

This precision guide can be moved up or down the steel or it can be rotated around the steel to provide fresh areas of the steel surface for contact with the edge facets as previously used areas show significant wear. The guide can be readily moved and relocked in the new position.

While the angle C of the guide planes is shown as fixed, it should be clear that interchangeable guide plates 27 with different angles can be made available to coordinate with the angle of the sharpening device used initially to abrade and set the angles A of the edge facets. Alternatively the guide 15 and the guide plates 27 can be designed so that the angle C is adjustable and individually angularly adjustable.

Figure 2:
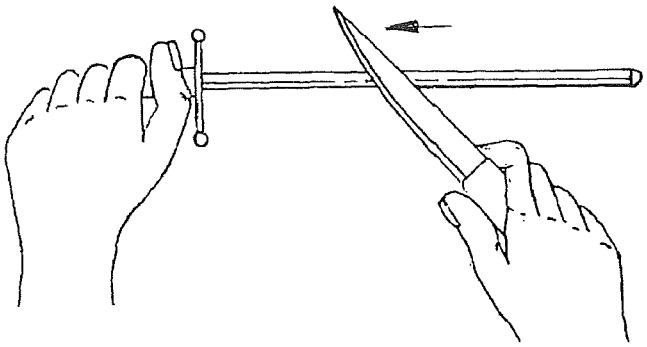
Fig. 2. (Prior Art)

The use of a spring 21 to hold the blade precisely is desirable for the best results but its use is of course optional. A full length manual steel or a shorter section of steel can be used in this design. If a conventional steel is used, its point or end can be rested on a table or counter as shown in FIG. 1. Alternatively as described later this type guiding mechanism can be mounted on a table or counter and a steel or an equivalent rod can be mounted in and clamped to the angle guide.

Alternative examples of precision angle guiding structure 29 to develop these desirable edge microstructures are shown in FIGS. 16, 17, 18 and 19. Each of these contain a support structure 31 with one or more vertical slots 33 to align precisely moving knife guides 29 with one or more steels 13. The knife guide planes 7 are consequently set at angle C relative to the plane of the steel rods 13 at the point where the facets of knife 1 will contact the steel rods. (It should be recognized that hardened steel rods or bars of shapes and surface structures other than the conventional steel rods can be used in these designs.)

Figure 17:
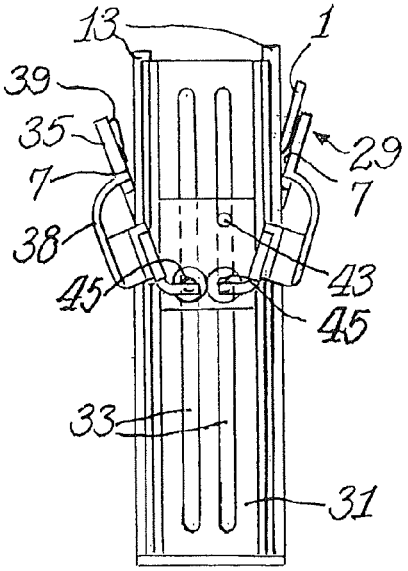
FIGS. 16-19 illustrate an alternative guide in accordance with this invention.
Figure 16:
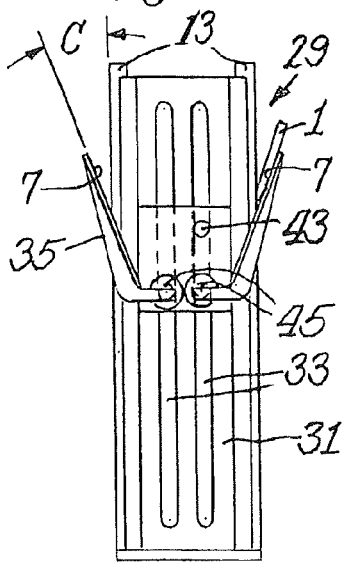

As one face of knife 1, FIGS. 16 and 17 is positioned in intimate contact with the guide plane 7 it can be moved along that guide plane while the edge facet remains in contact with the steel rods 13. The spring 39 is desirable but not necessary to insure good contact of the blade face with guide plane 7. A second spring mechanism 41 shown in FIG. 18 can be incorporated to hold the moving guides 35 in a rest position but to allow the moving guides 35 to be displaced downward by the user as he applies a downward force on the blade as its face is held in contact with the knife guide plane 7 and the edge facet is held in contact with the surface of the steel 13. This unique design allows a facet of the blade simultaneously to move transversely to the surface of the hardened steel 13 and to move longitudinally along the surface of the steel. This combined motion gives the user the options of moving the blade edge across the steel, along the axis of the steel, or in combination in order to create slightly different microstructures along the edge. Importantly, however regardless of that motion, angle C always remains the same during each stroke along the entire edge length. The sharpness of the edge and the integrity of the formed microstructure depends highly on retaining the angle C stroke after stroke within a closely controlled angular range.

In this arrangement pin 43 extends thru one of the guide slots to prevent any change in alignment of the sliding guide structure 35 with the axis of the steel rods. Similar pins 45 extend into the slots 33 into close conformity with the slot width to prevent lateral movement of the moving guide structure, 35.

The hardened steel rods 13 can be rigidly mounted onto base structure 31 or they can be supported on a slightly elastomeric or spring-like substrate that will allow them to move laterally a small amount in response to any significant variation in pressure from the knife edge structure as it impacts the steel surface.

The rate at which the desired microstructure develops and is reconstituted along the knife edge is related to amount of pressure applied by the knife edge facet as it is moved in contact with the hardened steel surface. There is a large amplification of the force applied manually to the blade as that is translated to the small area or line of contact between the facet and the steel surface at the movement of contact. That stress level can be moderated and made more uniform by only a very slight lateral motion of the steel surface.

Figure 18:
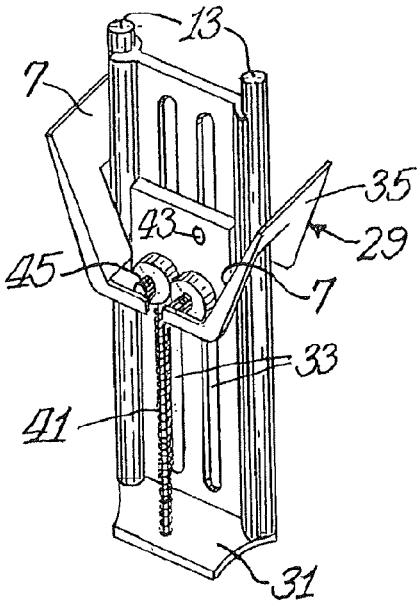
Figure 19:
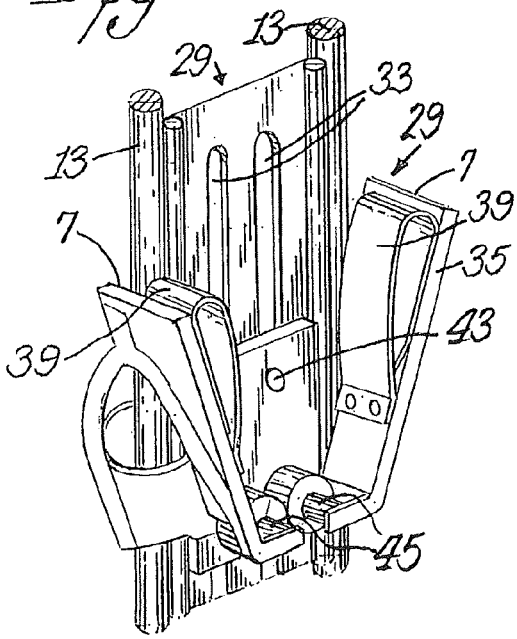

The guide and the knife holding spring mechanism of FIG. 19 can be readily modified to include a longer knife guiding surface and a second spring extending to the opposite side of the steel rod with larger guide surfaces similar to those of FIGS. 16 and 18. The knife holding spring 38 of FIG. 17 likewise can be on one or both areas of each guide surface. Further the guide support arms can be designed to be replaceable or adjustable to provide the means to vary or set angle C optimally in relation to the original sharpening angle A that created the original angle of the knife facets.

The various unique structures of controlling the angle of the knife as described and illustrated to optimize the novel results and edge conditioning obtainable by precision angle control when passing the knife facets into close angular contact with a hardened steel rod or other hardened surface are equally applicable to sharpen facets at precise angles in contact with abrasive surfaces. Accordingly, the invention can be practiced using an abrasive surface instead of a steeling member.

Figure 25:
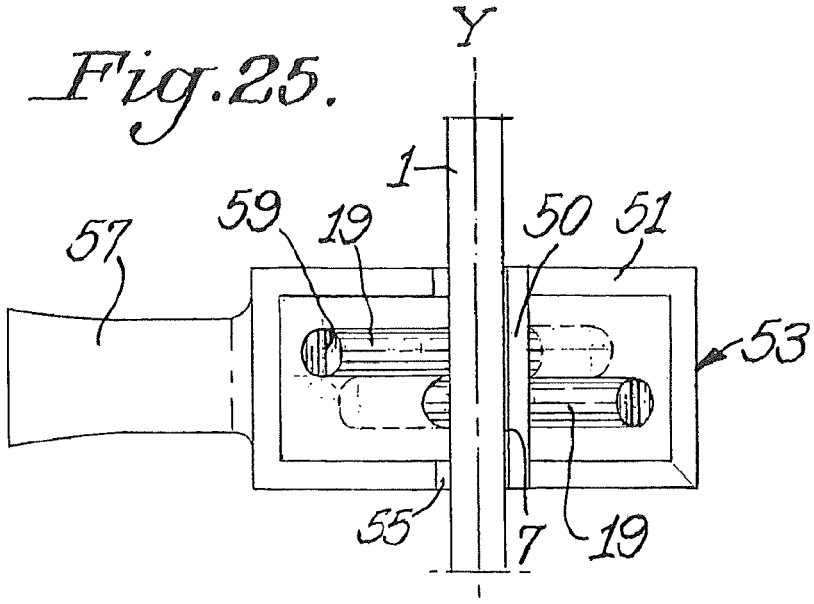
FIGS. 24-25 are side elevational and top views of an arrangement utilizing plural steeling members in accordance with this invention.
Figure 24:
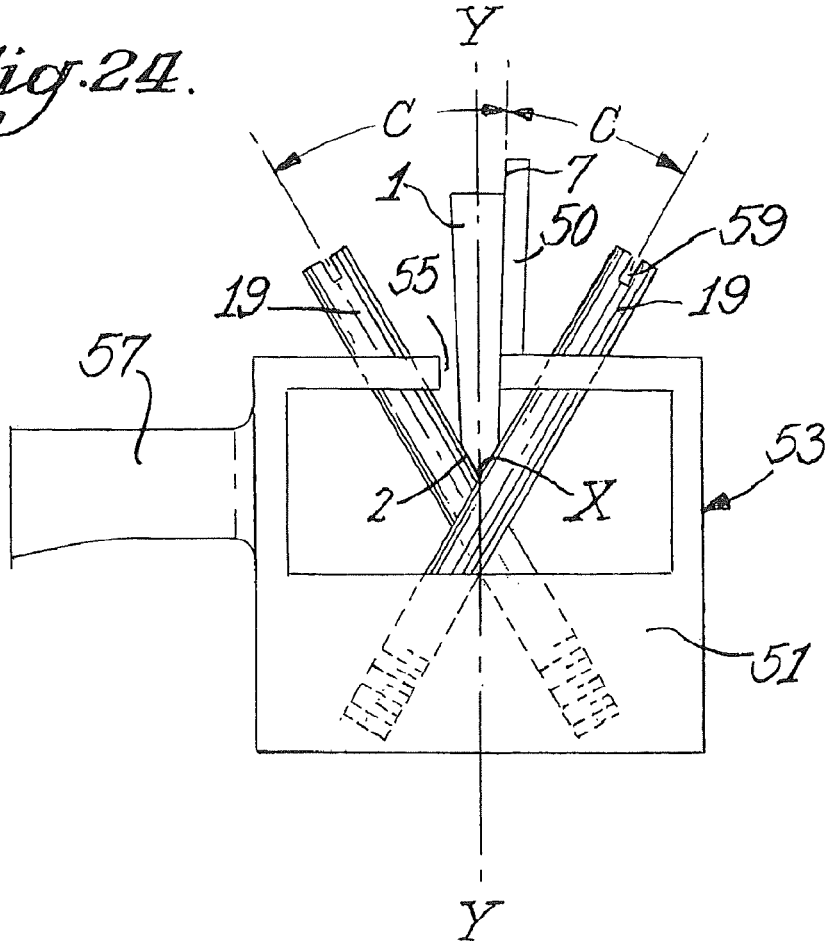

A further example of a novel structure of creating this unique microscopic structure along a knife edge is illustrated in FIGS. 24 and 25. In this unique arrangement a fixed knife guide plane 7 is created on one side of a rigid planar guide structure 50 attached to the body of 51 of the steeling apparatus 53. Sections of steel rods 19 are mounted by threaded ends into the body of apparatus 53. The two steel sections are crossed as seen in FIG. 24 at a total angle equal to twice angle C. The edge X of knife blade 1 is lowered into a slot 55 until its facets 2 contact one or both of the steel rods along the line of the edge. More than two steel rods 19 can be aligned in this manner in order to create a well defined line of contact for the knife edge facets with these steel rods 19. The guide structure 50 which establishes the position and alignment of guide plane 7 is offset slightly to one side of the centerline Y-Y of the blade which passes thru the vertex of the angles C that coincides with the line where the steel rods 19 cross. The amount of offset of plane 7 from the centerline Y-Y is approximately half of the thickness of blade 1. If desired the plane 7 can also be slightly angled in order to conform perfectly to any small taper that may characterize the blade faces.

In the apparatus of FIGS. 24 and 25, a handle 57 can be provided to stabilize the unit as it is being used or alternatively it can be physically attached to a table or other structure. In use the face of the knife is aligned with the guide plane 7 and held in good contact with that plane as the blade edge is stroked back and forth along the surface of the steel rods 19 until the desired microstructure is created along the cutting edge. A physical spring (not shown) can be added to press against the blade and to hold its face in good sustained conformity with the guide surface. Likewise a magnet can be added to attract the blade face to the guide face 7 as the blade is laid against that plane. The areas of contact where the blade facets contact a selected point on the surface of the steel rods can be changed and adjusted by rotating the rods using the slots 59 to extend or retract the rods accordingly. An obvious advantage of this configuration is that both edge facets can be conditioned simultaneously. By adding more than two rods even better confirmation of the facets with the rods can be obtained. Without the precise angular control shown in this apparatus, the optimal microstructure will not be created along the knife edge.

Precision apparatus such as described here for control of the angle while steeling a knife can be incorporated into food related work areas such as into butcher blocks, cutting boards, and knife racks or knife blocks so that they are conventionally and readily available in those areas where knives are commonly used.

Figure 21:
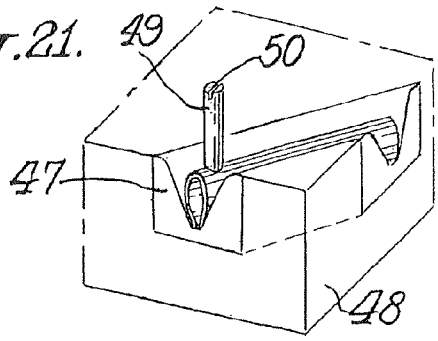
FIGS. 20-23 are perspective views showing alternative manners of mounting a guide in accordance with this invention.
Figure 22:
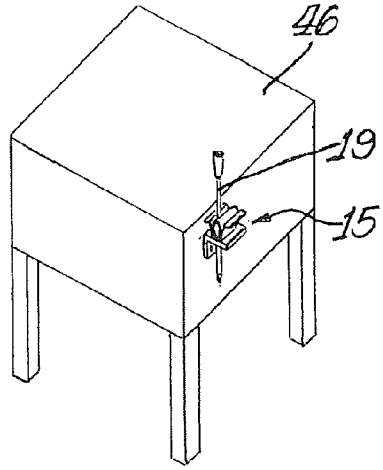

FIG. 22 illustrates how for example the guide 15 of FIGS. 11, 12, 13 and 14 can be attached to a counter butcher block. A manual butcher steel can be inserted into the guide structure as shown in FIG. 22 or a section of a steel or hardened steel rod can be mounted in the guide structure as in FIG. 21. The guide structure can be attached by a bracket as shown or embedded in a corner or parameter section of a counter or block-like surface as illustrated in FIG. 21.

Figure 20:
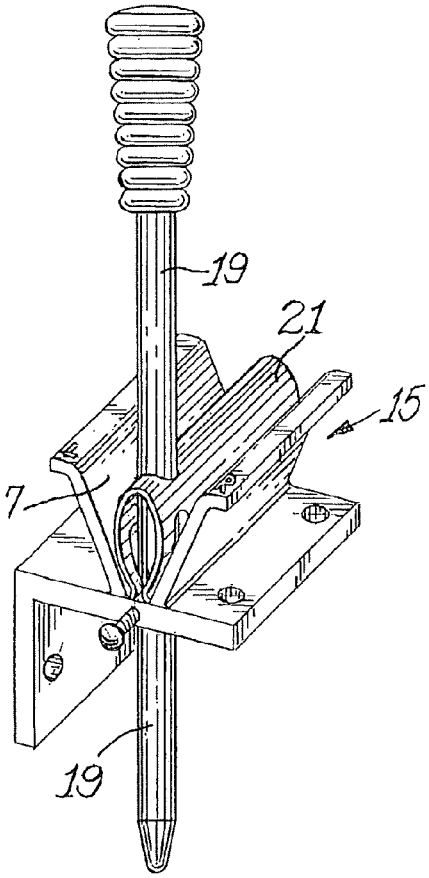

FIG. 20 illustrates a mountable angle guide 15 designed to accept a manual steel 19 a section of a steel or a hardened metal rod. This guide incorporates a convenient angle bracket so that it can be attached to any of a variety of knife work benches or work structure. For example it is shown attached to a knife block 52, FIG. 23. It can similarly be mounted on a salad prep table or work table, or butcher's block, FIG. 22.

FIG. 21 illustrates an embedded guide structure 47 as it would be mounted in the corner of a butcher block or cutting board 48. The length of a hardened steel rod 49 mounted in this guide can be shortened if desired so that it does not protrude above the top of the cutting board. That hardened rod 49 is slotted so that it can be rotated with a coin or screw driver to expose new areas of its surface. The rod 49 can be provided with an extended threaded section (not shown) on its lower end to allow the rod to move upward or downward as it is rotated to expose fresh areas of the rod surfaces.

Precision embedded guides such as illustrated in FIG. 21 can be mounted entirely within the perimeter of butcher blocks, counters and knife blocks, thus avoiding the awkwardness of an attachment-like structure.

Figure 23:
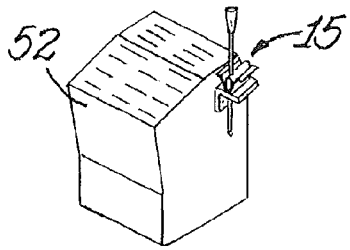

FIG. 23 illustrates a mounted precision guide on a knife block. Clearly the physical location of the guide can be on the side of such blocks or embedded within the top structure of such blocks so long as clearance is provided for the blade as it is moved along the guides and in contact with the guide planes.

FIGS. 21, 22, and 23 are intended only to be illustrative of the wide variety of locations where it is desirable to provide a means for precisely steeling the knife edge. This aspect of the invention generally involves providing a holder which can mount the angle guide and the sharpening steel to a support surface such as a food cutting board or a butcher block. Such holder would include first mounting structure to mount the holder itself to the support surface. The first mounting structure could be of the type such as illustrated in FIG. 22 where the holder itself is separate and distinct from the support surface and is mounted to the support surface by utilization of the downwardly extending flange connected to and extending away from the guide 15. Alternatively, the first mounting structure could be by having the holder itself integral with the support structure. The holder would also have second mounting structure for securing the steeling rod or hardened surface in a fixed position so that it is properly spaced with respect to the angle guide. The angle guide itself would also be mounted to the holder.

These inventors have shown repeatedly the surprising advantages of the microstructure that can be created if the knives steeled are with this level of angular control. The microstructure provided by these guided means is superior to manually steeled edges for cutting fibrous materials such as lemons, limes, meats, cardboard and paper products to name a few. The steeled edges remain sharp even after repetitive steeling and the knives need to be resharpened less frequently using abrasive means, thus removing less metal from the blades and lengthening the useful life of knives.

What is claimed is:

1. A sharpening apparatus for manually obtaining a microstructure of microteeth along the cutting edge of a blade having two faces that at their terminus having been sharpened forming two facets that intersect to create an elongated edge at the junction of the two facets, said apparatus comprising a member which is mounted to be non-rotating during sharpening, said member having a generally non-abrasive hardened surface, a precision angle guide mounted in intimate proximity to said member, said precision angle guide having an elongated two-dimensional planar knife-face contacting guide surface to be of sufficient size to establish the plane of the blade and along which a face of the blade can be stroked to position a facet of the blade in sustained moving contact with said hardened surface, said planar guide surface being at an angle to said hardened surface at the location of contact of the facet with said hardened surface, and said precision angle guide and said member when attached together forming a generally rigid assembly wherein said angle remains fixed and constant whereby during repeated strokes of the facet against said hardened surface at the constant angle alternating stresses of sufficient magnitude are created along the blade edge to harden the blade edge and make the blade edge more brittle and prone to fracture and fragment causing small sections of the blade edge to drop off leaving a microscopic microtooth-like structure along the blade edge.

2. An apparatus according to claim 1 where said guiding surface forms an acute angle with the axis of said hardened surface.

3. An apparatus according to claim 1 including a spring mounted to said guide to hold the face of the blade in intimate contact with said guiding surface as the knife face is drawn over said guiding surface.

4. An apparatus according to claim 1 where said guide is adjustably clamped to said member.

5. An apparatus according to claim 1 where the relative angular position of said guiding surface can be adjusted in order to alter the precisely established angle of the facet relative to the plane of said hardened surface.

6. An apparatus according to claim 1 where there are more than one members, a holder for the more than one members, and said angle guide providing a guiding surface for sustained sliding or rolling contact with one face of the blade as each of the edge forming facets is maintained in contact at precisely established angles relative to the surface plane of said more than one members at the point of contact of the facet and hardened surfaces.

7. An apparatus according to claim 6 where said guiding surface incorporates at least one magnet to attract the face of blade to said guiding surface.

8. An apparatus according to claim 7 where a resilient element is used to hold the face of blade in contact with said guiding surface.

9. An apparatus according to claim 1 including a holder, said holder having first mounting structure for mounting said holder to a support structure, said holder having second mounting structure for engaging and maintaining said member in a fixed position, and said precision angle guide mounted to said holder located with respect to said second mounting structure so that a facet of the guided knife blade edge makes sustained contact with said hardened surface at a precisely established angle as the knife is moved along said angle guide surface.

10. An apparatus according to claim 9 where said holder is attached to a structure selected from the group consisting of a food cutting board and a butcher block and a knife block.

11. An apparatus according to claim 1 including a base structure, said base structure having mounting structure for attachment to said member, said mounting structure having a lock mechanism for holding said member in a fixed position, and said precision angle guide mounted to said base structure and having said guide surface located with respect to said mounting structure so that a facet of the guided knife blade edge makes sustained contact with said hardened surface at a precisely established angle as the knife is moved along said guide surface.

12. An apparatus according to claim 11 where there are two of said angle guides located opposite each other, and said mounting structure being positioned between said angle guides.

13. An apparatus according to claim 12 where said mounting structure comprises a collar, and said lock mechanism comprises a pivoted lever selectively actuating a cam for being disposed against the object.

14. An apparatus according to claim 1 where said hardened surface has an arcuate shape at the location of contact.

15. An apparatus according to claim 1 where said angle guide is mounted directly to said member.

16. An apparatus according to claim 1 where said planar guide surface is a single continuous surface.

17. An apparatus for manually sharpening the edge of a knife blade comprising a movable precision angle guide for a knife blade with two faces each of which terminates in an edge facet which meet to form the edge, said guide being mounted on a supporting structure that allows sliding movement of said guide in a direction parallel to the axis of a stationary sharpening member in response to hand pressure applied to the blade as one face of the blade is held in sustained contact with said guide and drawn manually along said guide and in a direction nominally perpendicular to the axis of the sharpening member with said precision guide angled to position the plane of one blade facet in sustained contact with the sharpening member at a predetermined angle relative to the plane of the sharpening member at the point of contact with the sharpening member, where the movement of said guide in response to hand pressure applied to the blade is resisted by a supporting spring, where said guide is a first movable angle knife guide mounted slidingly on a supporting structure and a second movable angle guide mounted on the same structure, the sharpening member being a hardened steeling rod, each of said guides mounted slidingly in juxtaposition to a corresponding one of said hardened steeling rods to permit said guides to move in a direction parallel to the axis of said rods as each is moved manually by the motion of the knife as it is drawn in a direction nominally perpendicular to the axis of said rods with one edge facet in contact with the corresponding hardened steel rod.

18. A method for obtaining a microstructure of microteeth along an elongated edge of a knife blade which has two faces that at their terminus form two edge facets that intersect to create the elongated edge at the junction of the two facets, the method comprising providing at least one precision knife guide having a planar knife face contacting surface, providing in intimate proximity with the at least one precision knife guide at least one member having a hardened surface which is substantially free of abrasive particles, the hardened surface having a hardness at least equal to the hardness of the knife blade, repeatedly placing each face of the knife blade against the planar knife face contacting surface of the at least one precision knife guide, maintaining each knife blade face alternately in sustained moving contact with the face contacting surface of the knife guide as each facet is stroked against the hardened surface at a location of contact while the hardened surface is non-rotating, and maintaining sustained contact between each facet and the hardened surface on each stroke to locally stress and fracture the edge of the blade on repeated stroking until a microscopic serration is created along the edge.

19. The method of claim 18 where there is a single knife guide, and selectively stroking each of the two faces of the blade against the planar face contacting surface bf the single knife guide.

20. The method of claim 18 where there is a hardened surface at two opposite locations with one of the knife guides at each of the two opposite locations, and stroking one of the blade faces against one of the knife guides and the other of the blade faces against the other of the knife guides.

21. The method of claim 18 where the hardened surface is of non-planar shape at the location of contact, and including disposing the facet at an angle with respect to the hardened surface of less than 10 degrees during the stroking.

22. The method of claim 18 wherein the moving edge of the blade is repeatedly wedged against the hardened surface between the hardened surface and the knife guide surface at the location of contact with the hardened surface.

23. The method of claim 18 where the planar knife face contacting surface is a single continuous elongated surface.

24. The method of claim 18 including contacting only one facet at a time with a hardened surface whereby while each facet is stroked against a hardened surface the other facet is out of contact with any hardened surface.

25. A holder for manually sharpening the edge of a knife blade having two faces that at their terminus having been sharpened forming two facets that intersect to create an elongated edge at the junction of the facets, said holder comprising a supporting structure supporting and positioning at least one sharpening member, at least one movable precision angle guide structure supported by said supporting structure, said angle guide structure having a planar knife-face contacting guide surface along which a face of the blade can be stroked to position a facet of the blade in sustained moving contact at an angle with said sharpening member, said guide structure being slidably mounted to said supporting structure to selectively dispose said guide surface at different locations with respect to said sharpening member, aligning structure engaging said guide structure to said supporting structure for maintaining the angle of said guide surface constant when said guide structure is moved to different positions with respect to said supporting structure and said sharpening member, and where said sharpening member is a non-abrasive sharpening steel.

26. A holder for manually sharpening the edge of a knife blade having two faces that at their terminus having been sharpened forming two facets that intersect to create an elongated edge at the junction of the facets, said holder comprising a supporting structure supporting and positioning at least one sharpening member, at least one movable precision angle guide structure supported by said supporting structure, said angle guide structure having a planar knife-face contacting guide surface along which a face of the blade can be stroked to position a facet of the blade in sustained moving contact at an angle with said sharpening member, said guide structure being slidably mounted to said supporting structure to selectively dispose said guide surface at different locations with respect to said sharpening member, aligning structure engaging said guide structure to said supporting structure for maintaining the angle of said guide surface constant when said guide structure is moved to different nositions with respect to said supporting structure and said sharpening member, where said supporting structure supports two spaced sharpening members, and said guide structure having two mirror image guide surfaces each of which is disposed at a respective one of said sharpening members.

* * * * *